(12) United States Patent
Filatov et al.

(10) Patent No.: US 9,559,565 B2
(45) Date of Patent: Jan. 31, 2017

(54) HOMOPOLAR PERMANENT-MAGNET-BIASED ACTION MAGNETIC BEARING WITH AN INTEGRATED ROTATIONAL SPEED SENSOR

(71) Applicant: Calnetix Technologies, LLC, Cerritos, CA (US)

(72) Inventors: Alexei Filatov, Irvine, CA (US); Josh Bowman, Cerritos, CA (US)

(73) Assignee: Calnetix Technologies, LLC, Cerritos, CA (US)

( * ) Notice: Subject to any disclaimer, the term of this patent is extended or adjusted under 35 U.S.C. 154(b) by 349 days.

(21) Appl. No.: 14/444,293

(22) Filed: Jul. 28, 2014

(65) Prior Publication Data

US 2015/0054389 A1   Feb. 26, 2015

Related U.S. Application Data

(60) Provisional application No. 61/869,001, filed on Aug. 22, 2013.

(51) Int. Cl.
*H02K 7/09* (2006.01)
*F04D 29/048* (2006.01)
(Continued)

(52) U.S. Cl.
CPC ............. *H02K 7/09* (2013.01); *F04D 29/048* (2013.01); *F04D 29/058* (2013.01);
(Continued)

(58) Field of Classification Search
CPC ......... H02K 7/09; H02K 11/00; F04D 29/058; F04D 29/048; F16C 32/0489; F16C 32/0465; F16C 32/048; F16C 32/0485; F16C 32/0446
See application file for complete search history.

(56) References Cited

U.S. PATENT DOCUMENTS 1,916,256 A   7/1933   Chandeysson
2,276,695 A   3/1942   Lavarello
(Continued)

FOREIGN PATENT DOCUMENTS

DE   102006004836   5/2007
EP        774824   5/1997
(Continued)

OTHER PUBLICATIONS

U.S. Appl. No. 13/045,379, filed Mar. 10, 2011, Filatov.
(Continued)

*Primary Examiner* — Tran Nguyen
(74) *Attorney, Agent, or Firm* — Fish & Richardson P.C.

(57) ABSTRACT

Radial poles are placed around a radial actuator target mounted on a body. The poles are separated from a cylindrical surface of the target by radial gaps and adapted to communicate a magnetic flux with it. The radial poles are equipped with electrical control windings and magnetically coupled to form magnetic control circuits. A flux return pole is adjacent to the body, separated from it by an air gap and adapted to communicate a magnetic flux with the radial actuator target. A permanent magnet generates a magnetic bias flux in the magnetic bias circuit formed by the radial actuator target, the radial poles and the magnetic flux return pole. A radial force is exerted on the actuator when the control windings are energized with a current. A Hall effect sensor measures bias magnetic field in the air gap between the magnetic flux return pole and the body. A feature on a (Continued)

body is adapted to produce a circumferentially local discontinuity in the magnetic field measured by the Hall effect sensor as the body rotates.

17 Claims, 7 Drawing Sheets

(51) Int. Cl.
*F16C 32/04* (2006.01)
*F04D 29/058* (2006.01)

(52) U.S. Cl.
CPC ........ *F16C 32/048* (2013.01); *F16C 32/0446* (2013.01); *F16C 32/0465* (2013.01); *F16C 32/0485* (2013.01); *F16C 32/0489* (2013.01)

(56) References Cited

U.S. PATENT DOCUMENTS

| | | | |
|---|---|---|---|
| 2,345,835 A | 4/1944 | Serduke |
| 2,409,857 A | 10/1946 | Hines et al. |
| 2,917,636 A | 12/1959 | Akeley |
| 3,060,335 A | 10/1962 | Greenwald |
| 3,064,942 A | 11/1962 | Martin |
| 3,243,692 A | 3/1966 | Heissmeier et al. |
| 3,439,201 A | 4/1969 | Levy et al. |
| 3,937,533 A | 2/1976 | Veillette |
| 3,943,443 A | 3/1976 | Kimura et al. |
| 4,093,917 A | 6/1978 | Haeussermann |
| 4,127,786 A | 11/1978 | Volkrodt |
| 4,170,435 A | 10/1979 | Swearingen |
| 4,260,914 A | 4/1981 | Hertrich |
| 4,358,697 A | 11/1982 | Liu et al. |
| 4,362,020 A | 12/1982 | Meacher et al. |
| 4,415,024 A | 11/1983 | Baker |
| 4,535,289 A | 8/1985 | Abe et al. |
| 4,560,928 A | 12/1985 | Hayward |
| 4,635,712 A | 1/1987 | Baker et al. |
| 4,639,665 A | 1/1987 | Gary |
| 4,642,501 A | 2/1987 | Kral et al. |
| 4,659,969 A | 4/1987 | Stupak |
| 4,731,579 A | 3/1988 | Petersen et al. |
| 4,740,711 A | 4/1988 | Sato et al. |
| 4,806,813 A | 2/1989 | Sumi et al. |
| 4,920,291 A | 4/1990 | McSparran |
| 4,948,348 A | 8/1990 | Doll et al. |
| 5,003,211 A | 3/1991 | Groom |
| 5,083,040 A | 1/1992 | Whitford et al. |
| 5,115,192 A | 5/1992 | Bardas et al. |
| 5,241,425 A | 8/1993 | Sakamoto et al. |
| 5,315,197 A * | 5/1994 | Meeks ................ F16C 32/0476 310/90.5 |
| 5,481,145 A | 1/1996 | Canders et al. |
| 5,514,924 A | 5/1996 | McMullen et al. |
| 5,559,379 A | 9/1996 | Voss |
| 5,589,262 A | 12/1996 | Kiuchi et al. |
| 5,627,420 A | 5/1997 | Rinker et al. |
| 5,672,047 A | 9/1997 | Birkholz |
| 5,739,606 A | 4/1998 | Takahata et al. |
| 5,767,597 A | 6/1998 | Gondhalekar |
| 5,831,431 A | 11/1998 | Gottfried-Gottfried et al. |
| 5,939,879 A | 8/1999 | Wingate et al. |
| 5,942,829 A | 8/1999 | Huynh |
| 5,994,804 A | 11/1999 | Grennan et al. |
| 6,087,744 A | 7/2000 | Glauning |
| 6,130,494 A | 10/2000 | Schöb |
| 6,148,967 A | 11/2000 | Huynh |
| 6,167,703 B1 | 1/2001 | Rumez et al. |
| 6,191,511 B1 | 2/2001 | Zysset |
| 6,259,179 B1 | 7/2001 | Fukuyama et al. |
| 6,268,673 B1 | 7/2001 | Shah et al. |
| 6,270,309 B1 | 8/2001 | Ghetzler et al. |
| 6,304,015 B1 | 10/2001 | Filatov et al. |
| 6,313,555 B1 | 11/2001 | Blumenstock et al. |
| 6,325,142 B1 | 12/2001 | Bosley et al. |
| 6,359,357 B1 | 3/2002 | Blumenstock |
| 6,437,468 B2 | 8/2002 | Stahl et al. |
| 6,465,924 B1 | 10/2002 | Maejima |
| 6,664,680 B1 | 12/2003 | Gabrys |
| 6,700,258 B2 | 3/2004 | McMullen et al. |
| 6,727,617 B2 | 4/2004 | McMullen et al. |
| 6,794,780 B2 | 9/2004 | Silber et al. |
| 6,856,062 B2 | 2/2005 | Heiberger et al. |
| 6,876,194 B2 | 4/2005 | Lin et al. |
| 6,885,121 B2 | 4/2005 | Okada et al. |
| 6,897,587 B1 | 5/2005 | McMullen et al. |
| 6,925,893 B2 | 8/2005 | Abe et al. |
| 6,933,644 B2 | 8/2005 | Kanebako |
| 7,042,118 B2 | 5/2006 | McMullen et al. |
| 7,135,857 B2 | 11/2006 | Johnson |
| 7,557,480 B2 | 7/2009 | Filatov |
| 7,635,937 B2 | 12/2009 | Brunet et al. |
| 8,169,118 B2 | 5/2012 | Filatov |
| 8,482,174 B2 | 7/2013 | Filatov |
| 2001/0017500 A1 | 8/2001 | Hirama et al. |
| 2001/0030471 A1* | 10/2001 | Kanebako ........... F16C 32/0465 310/90.5 |
| 2002/0006013 A1 | 1/2002 | Sato et al. |
| 2002/0175578 A1 | 11/2002 | McMullen et al. |
| 2003/0155829 A1 | 8/2003 | McMullen et al. |
| 2003/0197440 A1 | 10/2003 | Hasagawa et al. |
| 2005/0093391 A1 | 5/2005 | McMullen et al. |
| 2007/0056285 A1 | 3/2007 | Brewington |
| 2007/0063594 A1 | 3/2007 | Huynh |
| 2007/0164627 A1* | 7/2007 | Brunet ................ F16C 32/0459 310/90.5 |
| 2007/0200438 A1 | 8/2007 | Kaminski et al. |
| 2007/0296294 A1 | 12/2007 | Nobe et al. |
| 2008/0211355 A1 | 9/2008 | Sakamoto et al. |
| 2008/0246373 A1 | 10/2008 | Filatov |
| 2008/0252078 A1 | 10/2008 | Myers et al. |
| 2009/0004032 A1 | 1/2009 | Kaupert |
| 2009/0201111 A1 | 8/2009 | Filatov |
| 2009/0295244 A1 | 12/2009 | Ries |
| 2010/0007225 A1 | 1/2010 | Platon et al. |
| 2010/0090556 A1 | 4/2010 | Filatov |
| 2010/0117627 A1 | 5/2010 | Filatov |
| 2010/0301840 A1 | 12/2010 | Filatov |
| 2011/0101905 A1 | 5/2011 | Filatov |
| 2011/0163622 A1* | 7/2011 | Filatov ..................... H02K 7/09 310/90.5 |
| 2011/0234033 A1 | 9/2011 | Filatov |

FOREIGN PATENT DOCUMENTS

| | | |
|---|---|---|
| EP | 1905948 | 4/2008 |
| GB | 2225813 | 6/1990 |
| JP | 63277443 | 11/1988 |
| JP | 2006136062 A | 5/2006 |

OTHER PUBLICATIONS

Hawkins, Lawrence A. et al., "Application of Permanent Magnet Bias Magnetic Bearings to an Energy Storage Flywheel," Fifth Symposium on Magnetic Suspension Technology, Santa Barbara, CA, Dec. 1-3, 1999, pp. 1-15.

Turboden—Organic Rankine Cycle, "Turboden High Efficiency Rankine for Renewable Energy and Heat Recovery," (2 pages), available at http://www.turboden.itiorc.asp, 1999-2003. printed Jul. 27, 2006.

Turboden—Applications, "Turboden High Efficiency Rankine for Renewable Energy and Heat Recovery," (1 page), available at http://www.turboden.it/applications_detail_asp?titolo=Heat+recovery, 1999-2003, printed Jul. 27, 2006.

Honeywell, "Genetron®245fa Applications Development Guide," (15 pages), 2000.

Hawkins, Lawrence A. et al., "Analysis and Testing of a Magnetic Bearing Energy Storage Flywheel with Gain-Scheduled, Mimo Control," Proceedings of ASME Turboexpo 2000, Munich, Germany, May 8-11, 2000, pp. 1-8.

(56) References Cited

OTHER PUBLICATIONS

McMullen, Patrick T. et al., "Combination Radial-Axial Magnetic Bearing," Seventh International Symposium on Magnetic Bearings, ETH Zurich, Aug. 23-25, 2000, pp. 473-478.
Hawkins, Lawrence et al., "Shock and Vibration Testing of an AMB Supported Energy Storage Flywheel," 8th International Symposium on Magnetic Bearings, Mito, Japan, Aug. 26-28, 2002, 6 pages.
McMullen, Patrick T. et al., "Design and Development of a 100 KW Energy Storage Flywheel for UPS and Power Conditioning Applications," 24th International PCIM Conference, Nuremberg, Germany, May 20-22, 2003, 6 pages.
Hawkins, Larry et al., "Development of an AMB Energy Storage Flywheel for Industrial Applications," 7th International Symposium on Magnetic Suspension Technology, Fukoka, Japan, Oct. 2003, 5 pages.
Freepower FP6,. "Freepower FP6 Specification & Dimensions for 6kWe Electricity Generating Equipment," (2 pages), 2000-2004, printed Jul. 26, 2006.
Hawkins, Larry et al., "Development of an AMB Energy Storage Flywheel for Commercial Application," International Symposium on Magnetic Suspension Technology, Dresden, Germany, Sep. 2005, 5 pages.
Freepower ORC Electricity Company with Industrial Processes, "Industrial Processes," (1 page), available at http://www.freepowerco.uk/site-5.htm, 2000-2006, printed Jul. 26, 2006.
Freepower ORC Electricity Company FP6 Product Description, "FP6," (1 page), available at http://www.freepower.co.uk/fp6.htm, 2000-2006, printed Jul. 26, 2006.
Freepower ORC Electricity Company FP120 Product Description, "FP120," (1 page), available at http://www.freepower.co.uk/fp120.htm, 2000-2006, printed Jul. 26, 2006.
Freepower ORC Electricity Company FP60 Product Description, "FP60," (1 page), available at http://www.freepower.co.uk/fp60.htm, 2000-2006, printed Jul. 26, 2006.
Freepower ORC Electricity Company Products Technical Overview "A System Overview," (1 page), available at http://www.freepower.co.uk/tech-overview.htm, 2000-2006, printed Jul. 26, 2006.
Freepower ORC Electricity Company with Landfill Flarestacks, Flarestacks (Landfill & Petrochemical), (1 page) available at http://www.freepower.co.uk/site-2.htm, 2000-2006, printed Jul. 26, 2006.
Huynh, Co et al., "Flywheel Energy Storage System for Naval Applications," GT 2006-90270, Proceedings of GT 2006 ASME Turbo Expo 2006: Power for Land, Sea & Air, Barcelona, Spain, May 8-11, 2006, pp. 1-9.
Freepower ORC Electricity Company Home Page, "Welcome to Freepower," (1 page) available at http://www.freepower.co.uk/, Jul. 18, 2006.
PureCycle: Overview, "Super-efficient, reliable, clean energy-saving alternatives—the future is here," (1 page) available at http://www.utcpower.com/fs/com/bin/fs_com_Page/0,5433,03400,00.html, printed Jul. 26, 2006.
Ormat Web Site: "Recovered Energy Generation in the Cement Industry," (2 pages) available at http://www.ormat.com/technology_cement_2.htm, printed Jul. 26, 2006.
McMullen, Patrick et al., "Flywheel Energy Storage System with AMB's and Hybrid Backup Bearings," Tenth International Symposium on Magnetic Bearings, Martigny, Switzerland, Aug. 21-23, 2006, 6 pages.
Meeks, Crawford, "Development of a Compact, Lightweight Magnetic Bearing," 26th Annual AIAA/SAE/ASME/ASEE Joint Propulsion Conference, Jul. 16-18, 1990, 9 pages.
Ehmann et al., "Comparison of Active Magnetic Bearings With and Without Permanent Magnet Bias," Ninth International Symposium on Magnetic Bearings, Lexington, Kentucky, Aug. 3-6, 2004, 6 pages.
True Zero-Speed, High Accuracy Gear Tooth Sensor IC; Allegro Micro Systems Inc. 2009-2010 , ATS667LSG.

* cited by examiner

HOMOPOLAR PERMANENT-MAGNET-BIASED ACTION MAGNETIC BEARING WITH AN INTEGRATED ROTATIONAL SPEED SENSOR

CROSS-REFERENCE TO RELATED APPLICATIONS

This application is claims the benefit of priority to U.S. Provisional Application Ser. No. 61/869,001, filed on Aug. 22, 2013, the contents of which are hereby incorporated by reference.

TECHNICAL FIELD

This disclosure relates to measuring rotating speed, and, more particularly, to non-contact measuring rotating speed of rotors suspended without mechanical contact using homopolar permanent-magnet-biased active magnetic bearings.

BACKGROUND

Active Magnetic Bearings (AMBs) are often used to support rotating members in magnetic fields without a mechanical contact. In such systems, a need often arises in non-contact measurement of a rotating speed of the member.

SUMMARY

Description of Drawings

Like reference symbols in the various drawings indicate like elements.

DETAILED DESCRIPTION

This disclosure relates to measuring rotating speed, and, more particularly, to non-contact measuring rotating speed of rotors suspended without mechanical contact using homopolar permanent-magnet-biased Active Magnetic Bearings (AMB).

A magnetic bearing, such as an Active Magnetic Bearing (AMB), uses an electromagnetic actuator to apply a controlled electromagnetic force to support the moving member in a non-contact, or nearly non-contact, manner. The non-contact or nearly non-contact support provided by the magnetic bearing can provide frictionless or nearly frictionless movement of the member such as spinning around an axis. In certain implementations electromagnetic actuators may use permanent magnets, and may be referred to as Permanent-Magnet-Biased Electromagnetic Actuators. Electromagnetic actuators may be referred to as "homopolar" if in the absence of radial loading, the magnetic polarity stays the same around the rotor at a given axial position. Examples of homopolar actuators are discussed in the U.S. Pat. No. 8,169,118 titled "High-Aspect Ratio Homopolar Magnetic Actuator" and U.S. Pat. No. 8,482,174 titled "Electromagnetic Actuator".

If an Active Magnetic Bearing system is used to support a rotating member, there is often a need to measure the rotational speed of the member without a mechanical contact. The concepts presented herein are directed to an arrangement and a method of measuring the rotational speed utilizing a Hall effect sensor integrated into a magnetic bias flux return pole of a radial homopolar permanent-magnet-biased electromagnetic actuator. Since the sensor is integrated into the actuator it does not require an additional space inside the machine, making it more compact and improving rotordynamic performance.

Figure 1:
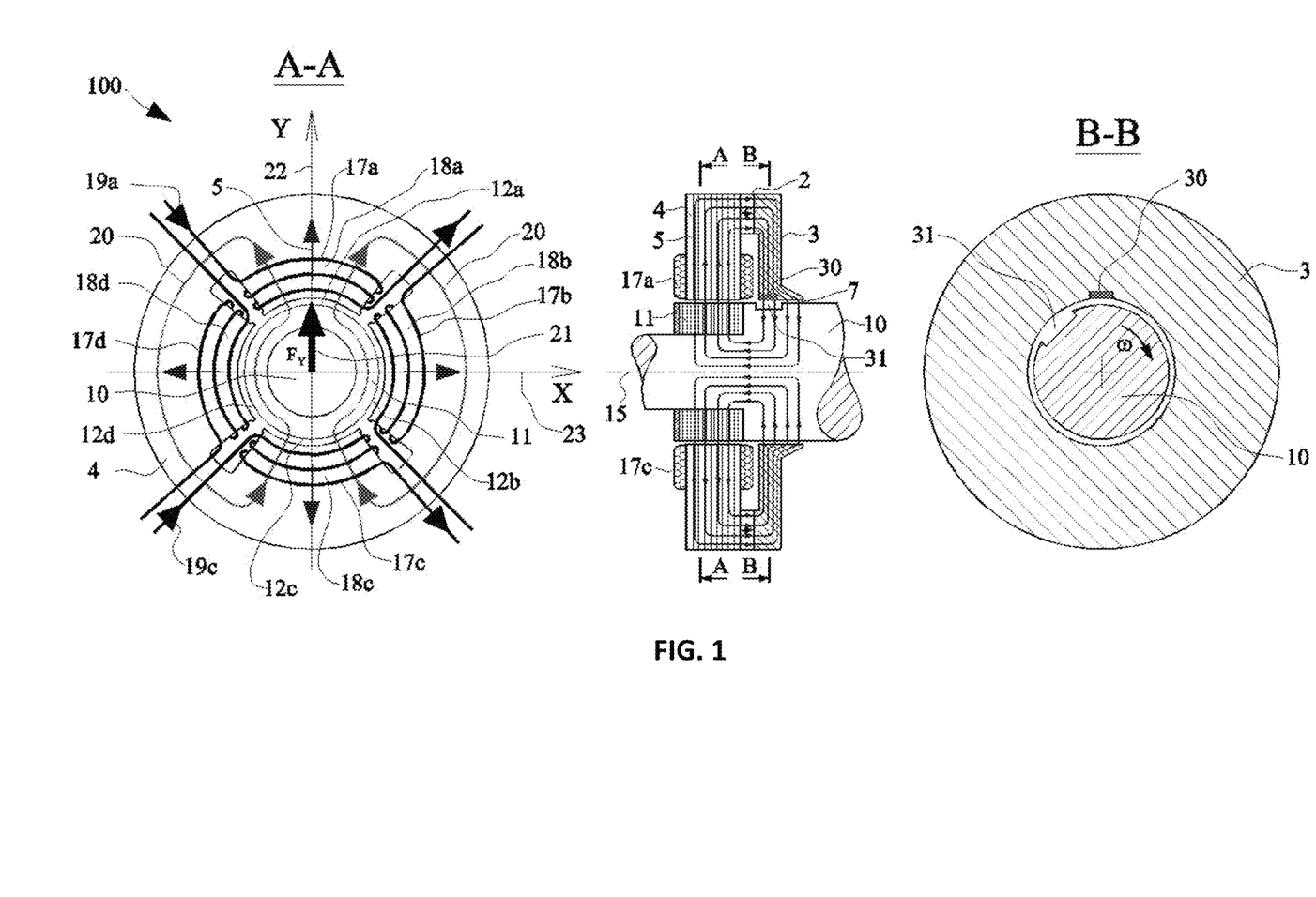
FIG. 1 illustrates design and operation of a Radial Homopolar Permanent-Magnet-Biased Electromagnetic Actuator with an Integrated Rotational Speed Sensor in accordance with the present disclosure.

FIG. 1 illustrates design and operation of a Rotational Speed Sensor integrated into a Radial Homopolar Permanent-Magnet-Biased Electromagnetic Actuator in accordance with the present disclosure. FIG. 1 shows one radial and two axial cross-sectional schematics of a Radial Homopolar Permanent-Magnet-Biased Electromagnetic Actuator (actuator 100) with an integrated speed sensor in accordance with the present disclosure. Permanent magnet 2 is sandwiched between a radial actuator pole assembly 4 and a magnetic bias flux return pole 3. More details of the radial actuator pole assembly 4 are shown in the cross-sectional view A-A on FIG. 1. The permanent magnet 2 generates a magnetic bias flux 5, which is guided by the magnetic bias flux return pole 3 toward the air gap 7 which separates the magnetic bias flux return pole 3 from a soft magnetic shaft 10. The magnetic bias flux 5 then is directed within the soft magnetic shaft 10 towards a radial actuator target 11, exits the radial actuator target 11 radially through radial air gaps 12a-12d, travels radially within radial magnetic poles 18a-18d towards the permanent magnet 2 where it completes the loop. In general, the positioning and composition of structural elements of the magnetic actuator 100 direct the magnetic flux 5 (generated by the permanent magnet 2) to propagate in accordance with the present disclosure.

The magnetic bias flux return pole 3, the shaft 10, the radial actuator target 11 and the radial pole assembly 4 may include or be composed of soft-magnetic materials (e.g., carbon steels and/or other soft magnetic material) that more effectively conduct magnetic fluxes than other materials.

The axial thickness of the magnetic bias flux return pole 3 may be chosen so that the pole material is magnetically saturated by the bias flux 5. Since the magnetic saturation levels of ferrous alloys are known to be nearly independent of the temperature within a typical operating temperature range, this feature results in a bias flux 5 being nearly constant over a typical operating temperature range.

The mechanism of the radial force generation in a Radial Homopolar Permanent-Magnet-Biased Electromagnetic Actuator is explained in Section A-A of FIG. 1. To produce radial forces in multiple (or all) directions within a radial plane, the radial pole assembly 4 is equipped with at least three radial control poles and control windings around these poles. For example, Section A-A of FIG. 1 shows four radial control windings 17a-17d located in slots between the poles 18a-18d. The bias flux 5 generated by the magnets 2 flows radially through the radial air gaps 12a-12d and within the radial poles 18a-18d. When the radial actuator target 11 is in the central position and there are no currents in windings 17a-17d, the bias flux density under each pole 18a-18d associated with windings 17a-17d is the same or similar because of the system symmetry. Therefore, the net radial force may approach zero or be close to zero. By energizing the radial control coils 17a-17d, the flux distribution can be altered so that a radial force would develop. For example, FIG. 1 shows coils 17a and 17c being energized with control currents 19a and 19c, respectively. These currents produce radial control flux 20. In the air gap 12a under the pole 18a associated with the control coil 17a, control flux 20 adds to the bias fluxes 5, while in the air gap 12c under the pole 18c associated with the control coil 17c, it subtracts. Since the flux density will be higher at the top of the radial actuator target 11 than at the bottom, there will be a radial force $F_Y$ 21 acting on the target, directed along the Y-axis 22 upwards in FIG. 1 (positive Y-direction). Similarly, by energizing windings 17b and 17d, a force can be produced in the direction of the X-axis 23.

The radial actuator target may include a lateral surface adjacent and spaced apart from the radial pole. In certain instances, the target may be concentric to the actuator (or rotational) axis 15, and may have a cylindrical (precisely or substantially cylindrical) shape.

In certain instances, the radial actuator pole assembly 4 and the radial actuator target 11 may be assembled of magnetically permeable and electrically conductive laminations (e.g., steel and/or other magnetically permeable and electrically conductive laminations) stacked axially and electrically isolated from each other. The isolation reduces eddy currents in these components induced when the rotor spins and/or the radial control windings 17a-17d are energized with time-varying currents to produce time-varying radial forces.

Figure 2:
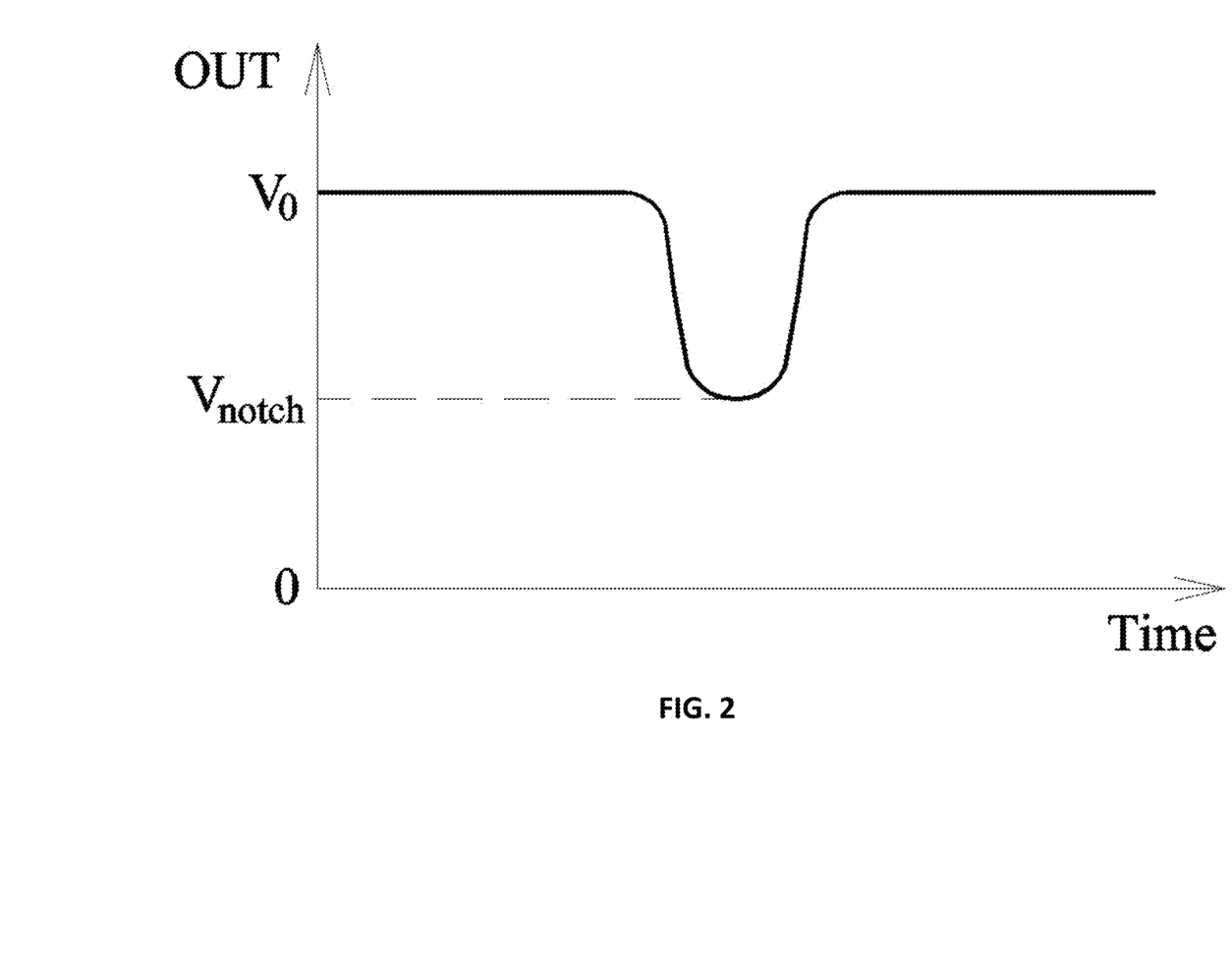
FIG. 2 schematically illustrates a typical voltage waveform on the output of the Hall-effect sensor in FIG. 1 when the rotor spins.

To measure a rotational speed of the shaft 10, the electromagnetic actuator 100 is equipped with a Hall-Effect sensor 30 embedded into the cylindrical surface of a magnetic bias flux return pole 3 adjacent to the shaft 10 or mounted in the air gap 7 separating the magnetic bias flux return pole 3 from the shaft 10. The Hall-Effect sensor 30 is configured to measure a radial component of the magnetic bias field 5 in the radial gap 7. Further, the shaft 10 has a feature, such as notch 31, interrupting the continuity of its cylindrical surface and axially collocated with the Hall-effect sensor 30. The notch produces a circumferentially local discontinuity in the magnetic field around the cylindrical surface of the shaft 10 in the air gap. The remainder of the magnetic field around the circumferential surface, axially collocated with the feature, is uniform (precisely or substantially) so that the discontinuity, magnetically speaking, is readily sensed by the Hall-effect sensor 30. Thus, the magnetic field 5 sensed by the Hall-effect sensor 30 will be smaller when the sensor 30 faces the notch 31 rather than a continuous cylindrical surface. FIG. 2 schematically illustrates a voltage pulse generated by a Hall-effect sensor when a notch on the rotor passes by. The sensor output voltage is equal to $V_0$ when the sensor faces a continuous surface of the rotor 10 and drops to a lower value $V_{notch}$ when the notch passes by the sensor. Such pulses can be counted with an external counter and the number of pulses per unit time can be used to calculate the rotational speed of the rotor.

Because the level of the magnetic bias flux 5 is maintained nearly constant due to the magnetic saturation of the magnetic bias flux return pole 3, the magnetic field measured by the Hall-effect sensor 30 at each specific orientation of the notch 31 will be nearly the same regardless the operating temperature, control currents in the windings 17a-17d and other factors. Therefore, all those factors will not affect the sensor operation.

The Hall-effect sensor can be of a programmable type, which parameters such as gain and output zero offset can be programmed even after the sensor was already installed into a machine. This feature may be used to eliminate affects of various parameter variations such as air gap 7, orientation and location of the Hall-effect sensor 30, depth of the notch 31, etc. The sensor parameters can be programmed after the sensor was installed so that the sensor outputs will be nearly the same from machine to machine if the sensor looks at the continuous surface of shaft 10 or the notch 31.

Figure 3:
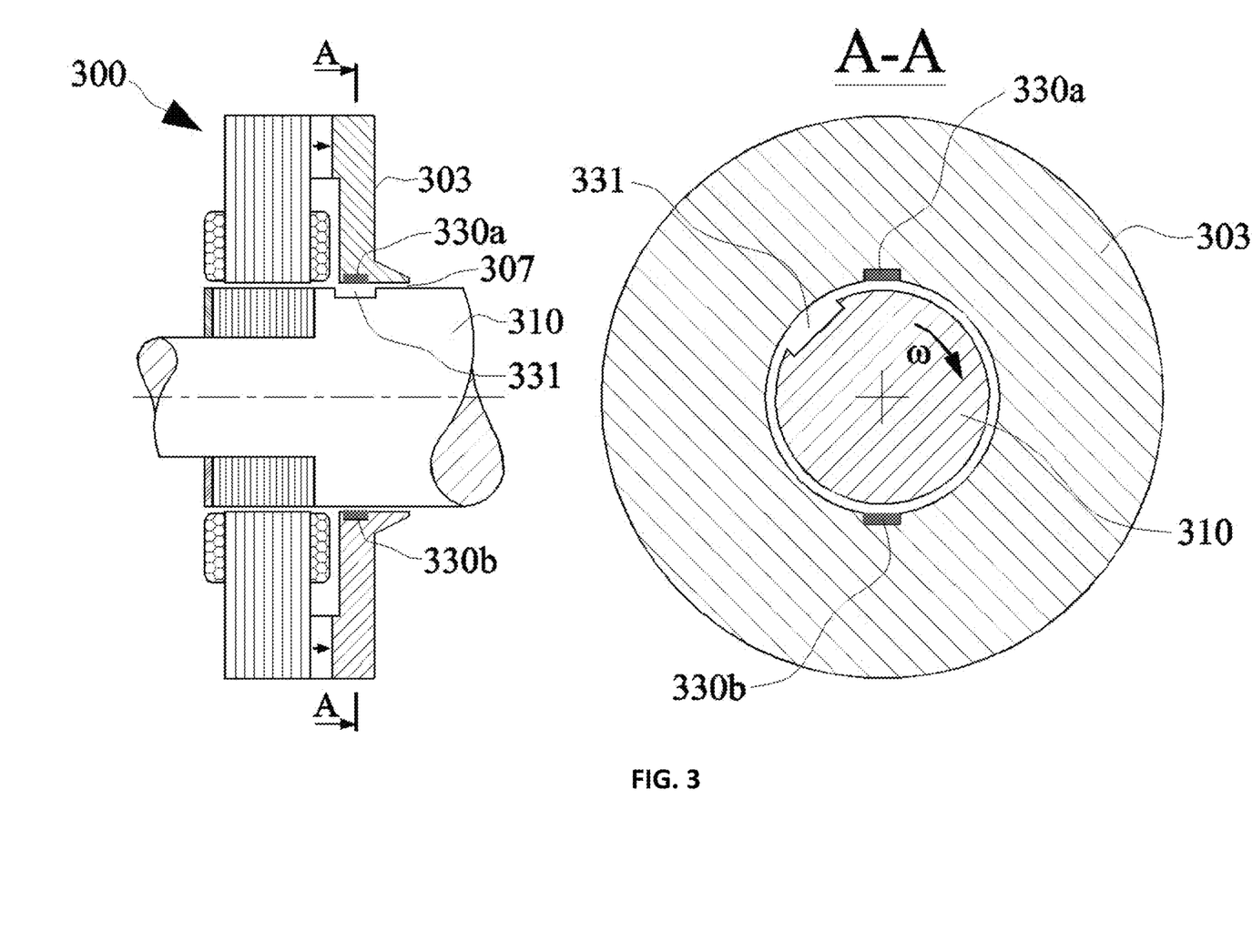
FIG. 3 illustrates design and operation of a Radial Homopolar Permanent-Magnet-Biased Electromagnetic Actuator with an Integrated Differential Rotational Speed Sensor in accordance with the present disclosure.
Figure 4:
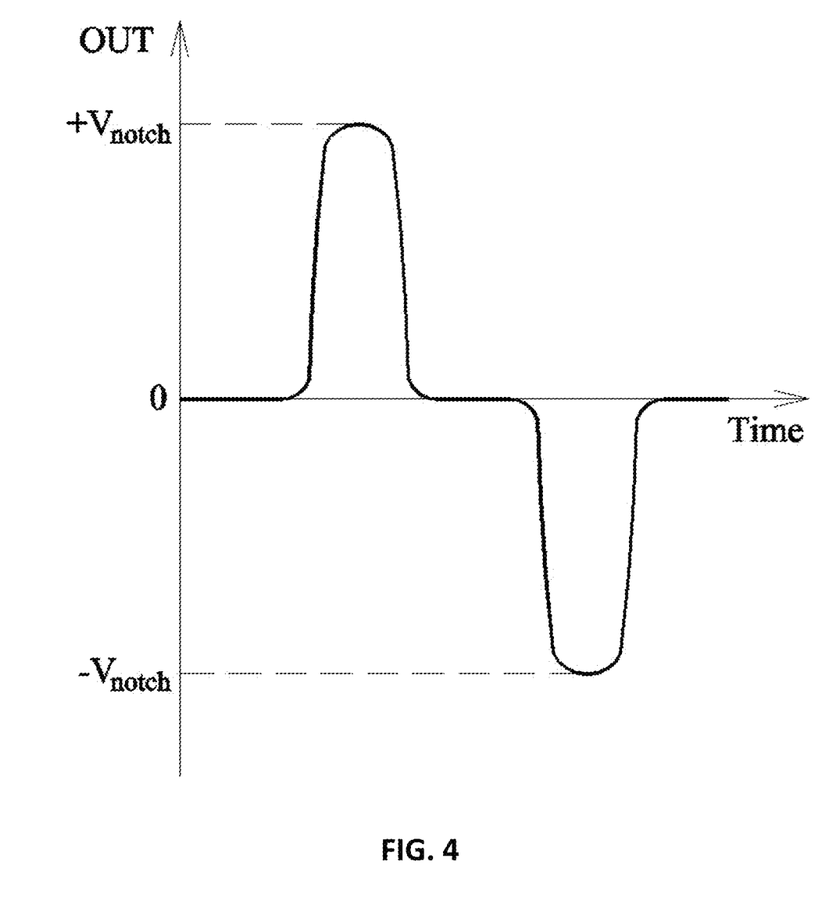
FIG. 4 schematically illustrates a typical voltage waveform on the output of the differential arrangement of Hall-effect sensors shown in FIG. 3 when the rotor spins.

FIG. 3 shows a different implementation of the proposed speed sensor using two Hall-Effect sensors 330a and 330b embedded into the cylindrical surface of a magnetic bias flux return pole 303 adjacent to the shaft 310 or mounted in the air gap 307 separating the magnetic bias flux return pole 303 from the shaft 310. The associated electronics generate a difference between the outputs of two Hall effects sensors 330a and 330b which is used to measure the rotational speed of the rotor 310 similar to the pulse shown in FIG. 2. Such a difference is shown in FIG. 4. The advantage of using two Hall effect sensors 330a and 330b per FIG. 3 instead of one Hall effect sensor 30 per FIG. 1 is that the base signal level $V_0$ in FIG. 2 may be affected by temperature and other factors (such as axial movements of the rotor 310), which may make detection of the pulse difficult, whereas in FIG. 4 the base level will always be zero or near zero if two Hall-effect sensors 330a and 330b are the same and exposed to the same temperature and other factors.

Figure 5:
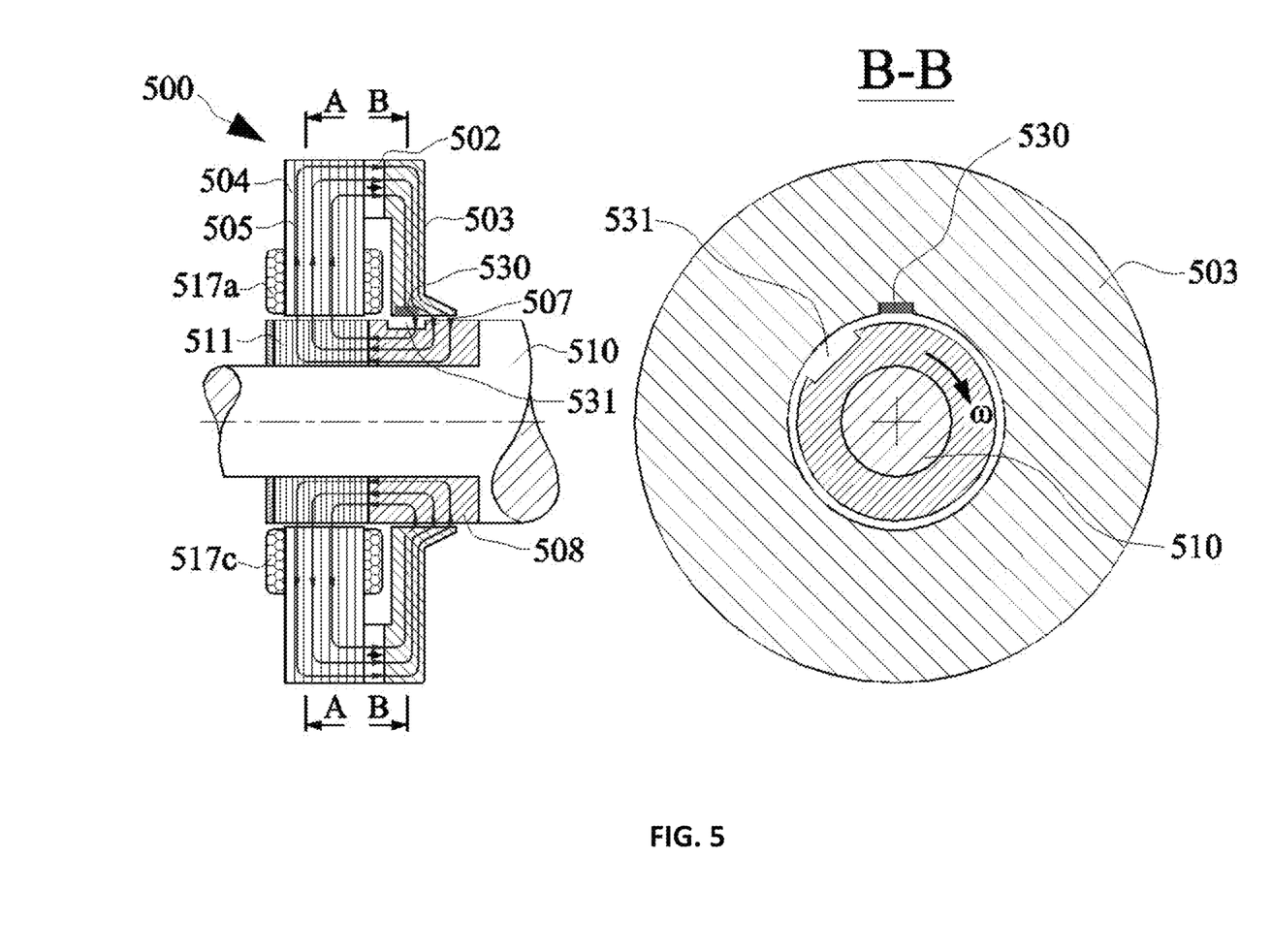
FIG. 5 illustrates design and operation of a Radial Homopolar Permanent-Magnet-Biased Electromagnetic Actuator with a non-magnetic rotor and an Integrated Rotational Speed Sensor in accordance with the present disclosure.

FIG. 5 shows a sensor implementation in a case when the shaft 510 is made of non-magnetic material. In this case a magnetically-permeable actuator target extension 508 can be added to the shaft 510 to conduct the bias magnetic flux 505 from the magnetic bias flux return pole 503 to the actuator target 511. A feature 531 triggering the speed sensor can be added to the actuator target extension 508 instead of magnetically permeable shafts 10 and 310 shown in FIGS. 1 and 3 respectively.

Figure 6:
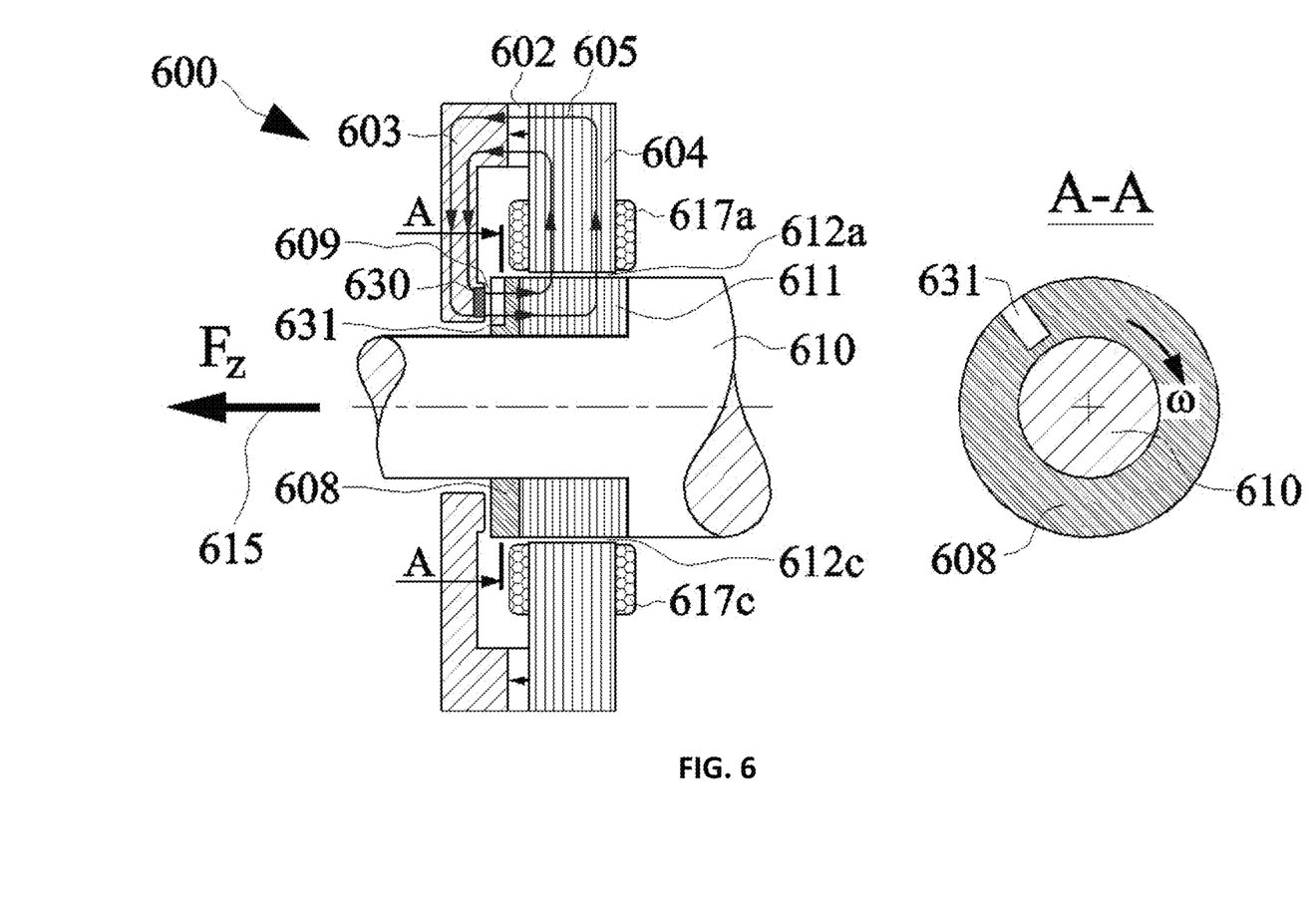
FIG. 6 illustrates design and operation of a Radial Homopolar Permanent-Magnet-Biased Electromagnetic Actuator with Axial Force Offset and an Integrated Rotational Speed Sensor in accordance with the present disclosure.

FIG. 6 shows another implementation of the proposed speed sensor in which the magnetic bias flux return pole 603 faces an axial facing surface of an actuator target extension 608 instead of the cylindrical surface as in FIGS. 5. Such a configuration produces an uncontrollable axial force $F_z$ 615 always pulling the rotor 610 towards the axial pole 603, which may be beneficial in some magnetic bearing applications, for example where there is a dominant external axial force pushing the rotor 610 away from the axial pole 603, which may be offset by the force $F_z$ 615.

In more details, permanent magnet 602 is sandwiched between a radial actuator pole assembly 604 and a magnetic bias flux return pole 603. The permanent magnet 602 generates a magnetic bias flux 605, which is guided by the magnetic bias flux return pole 603 toward the axial air gap 609 which separates the magnetic bias flux return pole 603 from an axial face of an actuator target extension 608. The magnetic bias flux 605 crosses the air gap 609, enters an actuator target extension 608 travels to the radial actuator target 611, then it exits the radial actuator target 611 radially through radial air gaps 612a-612d, travels radially within the radial actuator pole assembly 604 towards the permanent magnet 602 where it completes the loop. In general, the positioning and composition of structural elements of the magnetic actuator 600 direct the magnetic flux 605 (generated by the permanent magnet 602) to propagate in accordance with the present disclosure.

The magnetic bias flux return pole 603, the shaft 610, the radial actuator target 611, an actuator target extension 608 and the radial pole assembly 604 may include or be composed of soft-magnetic materials (e.g., carbon steels and/or other soft magnetic material).

The axial thickness of the magnetic bias flux return pole 603 may be chosen so that the pole material is magnetically saturated by the bias flux 605. Since the magnetic saturation levels of ferrous alloys are known to be nearly independent of the temperature within a typical operating temperature range, this feature results in a bias flux 605 being nearly constant over a typical operating temperature range.

The mechanism of the radial force generation in Radial Homopolar Permanent-Magnet-Biased Electromagnetic Actuator 600 shown in FIG. 6 is the same as in actuators shown in FIGS. 1 and 3. In addition, the actuator 600 also produces an uncontrollable and nearly constant force 615 due to presence of the bias magnetic flux 605 in the axial air gap 609.

To measure a rotational speed of the shaft 610, the electromagnetic actuator 600 is equipped with a Hall-Effect sensor 630 embedded into the axial surface of the magnetic bias flux return pole 603 adjacent to the axial face of the actuator target extension 608. Alternatively, the Hall-Effect sensor 630 may be mounted in the axial air gap 609 separating the magnetic bias flux return pole 603 from the actuator target extension 608. Further, the axial face of the actuator target extension 608 adjacent to the Hall-effect sensor 630 has a feature, such as notch 631, interrupting the continuity of the face and radially collocated with the Hall-effect sensor 630.

Because the level of the magnetic bias flux 605 is maintained nearly constant due to the magnetic saturation of the magnetic bias flux return pole 603, the magnetic field measured by the Hall-effect sensor 630 at each specific orientation of the notch 631 will be nearly the same regardless the operating temperature, control currents in the windings 617a-617d and other factors. Therefore, all those factors will not affect the sensor operation.

Similar to the speed sensor shown in FIG. 1, the speed sensor shown in FIG. 5 can also benefit from using programmable Hall-effect sensors and a differential sensor arrangement similar to the one shown in FIG. 3.

In some aspects, the proposed integrated rotational speed sensor may be used as a part of an Active Magnetic Bearing (AMB) system supporting a rotor of a rotational machine without a mechanical contact. In particular, when an AMB system is used in rotating machinery, the rotational speed sensor may deliver information about the rotational speed of the machine necessary for AMB operation and monitoring purposes. Since the sensor is integrated into a radial AMB design it does not require any additional space producing a more compact design with better rotordynamic characteristics. FIG. 6 shows an example of using an AMB system with an integrated speed sensor in an electric rotational machine 700. The rotational electric machine 700 can be, for example, an electric motor 704 driving an impeller 706 (e.g., liquid and/or gas impeller) mounted directly on the motor shaft 708. The electric motor 704 shown in FIG. 6 has a rotor 710 and a stator 712. Alternatively, the impeller 706 can be driven by a flow of gas or liquid and spin the rotor 710 attached to it through the shaft 708. In this case the motor 704 can be used as a generator which would convert the mechanical energy of the rotor 710 into electricity.

Figure 7:
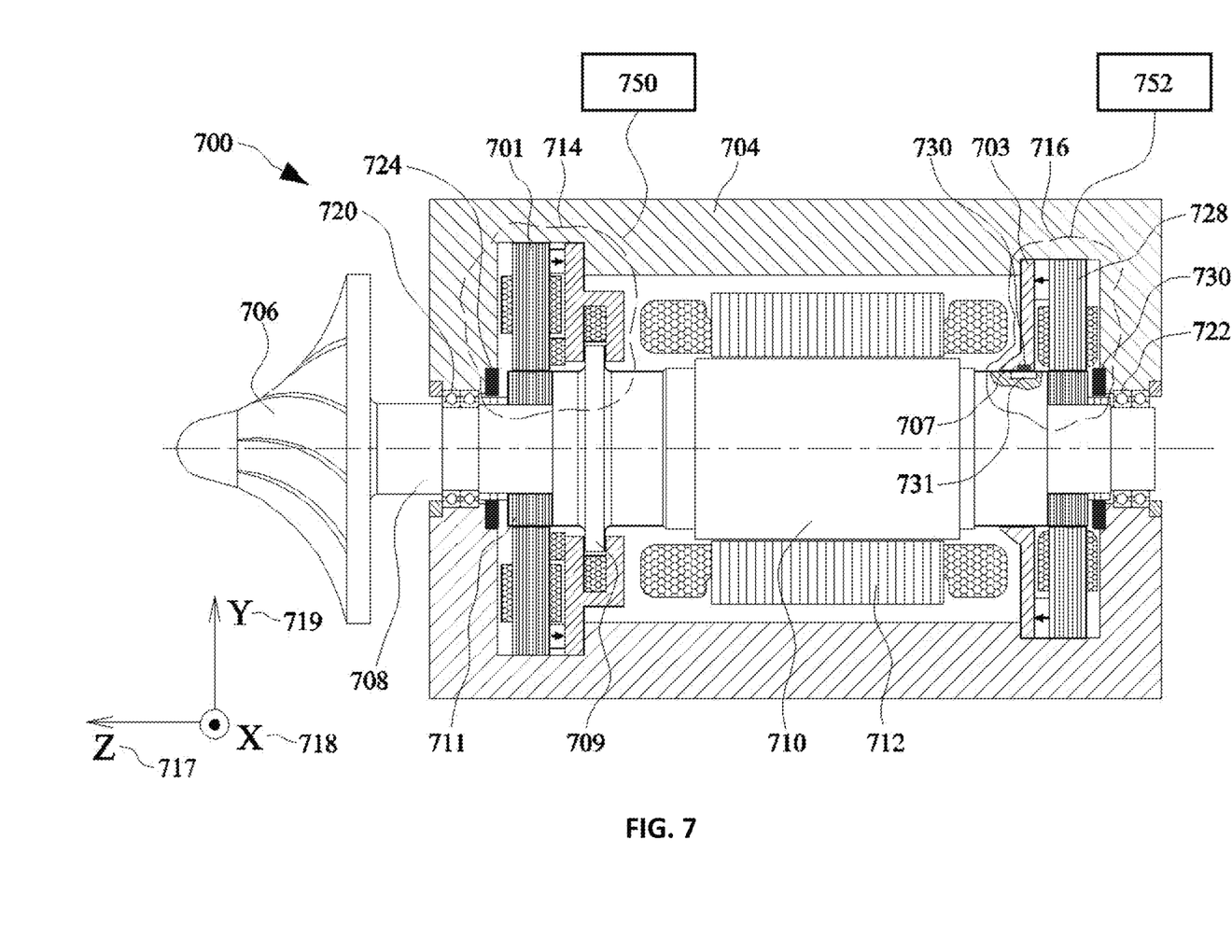
FIG. 7 is a cross-sectional schematic of an example of an electric machine on Active Magnetic Bearings utilizing a Radial Homopolar Permanent-Magnet-Biased Electromagnetic Actuator with integrated speed sensor in accordance with the present disclosure.

In embodiments, the rotor 710 of the electric machine 700 can be supported radially and axially without mechanical contact by front and rear radial AMBs 714 and 716. The front AMB 714 provides an axial suspension of the rotor 710 and a radial suspension of the front end of the rotor, whereas the rear AMB 716 provides only radial suspension of the rear end of the rotor 710. The rear AMB 716 is equipped with a rotational speed sensor per the concepts herein which includes a Hall-effect sensor 730 embedded into the cylindrical surface of a magnetic bias flux return pole 703 adjacent to the shaft 710 or mounted in the air gap 707 separating the magnetic bias flux return pole 703 from the shaft 710. Further, the shaft 710 has a feature, such as notch 731, interrupting the continuity of its cylindrical surface and axially collocated with the Hall-effect sensor 730.

When the AMBs 714 and 716 are not working, the rotor rests on the mechanical backup bearings 720 and 722. The front backup bearing 720 may provide the axial support of the rotor 710 and a radial support of the rotor front end, whereas the rear backup bearing 722 may provide radial support of the rear end of the rotor 710. There are radial clearances between the inner diameters of the mechanical backup bearings 720, 722 and the outer diameters of the rotor portions interfacing with those bearing to allow the rotor 710 to be positioned radially without touching the backup bearings 720, 722 when the AMBs 714 and 716 are activated. Similarly, there are axial clearances between the backup bearings 720, 722 and the portions of the rotor 710 interfacing with those bearings to allow the rotor 710 to be positioned axially without touching the backup bearings 720 and 722 when the AMBs 714 and 716 are activated.

In certain instances, the front AMB 714 may be a combination radial and axial electromagnetic actuator 701 per U.S. Pat. No. 8,482,174, combination radial/axial position sensors 724 and control electronics 750. The electromagnetic actuator 701 may be capable of exerting axial forces on the axial actuator target 709 and radial forces on the radial actuator target 711, both rigidly mounted on the rotor 710. The axial force is the force in the direction of Z-axis 717 and the radial forces are forces in the direction of X-axis 718 (directed out of the page) and the direction of Y-axis 719. The actuator may have three sets of coils corresponding to each of the axes and the forces may be produced when the corresponding coils are energized with control currents produced by control electronics 750. The position of the front end of the rotor in space is constantly monitored by non-contact position sensors, such as combination radial/axial position sensor 724.

Signals from the position sensors 724 may be input into the control electronics 750, which may generate currents in the control coils of the combination electromagnetic actuator 701 when it finds that the rotor is deflected from the desired position such that these currents may produce forces pushing the rotor back to the desired position.

The rear AMB 716 is an electromagnetic actuator 728, radial non-contact position sensors 725, and control electronics 752. It may function similarly to the front AMB 714 except that it might not be configured to control the axial position of the rotor 710 because this function is already performed by the front AMB 714. Correspondingly, the electromagnetic actuator 728 may not be able to produce controllable axial force and there may be no axial position sensor.

The electromagnetic actuator 728 is equipped with a rotational speed sensor per the concepts herein which includes a Hall-effect sensor 730 embedded into the cylindrical surface of a magnetic bias flux return pole 703 adjacent to the shaft 710 or mounted in the air gap 707 separating the magnetic bias flux return pole 703 from the shaft 710. Further, the shaft 710 has a feature, such as notch 731, interrupting the continuity of its cylindrical surface and axially collocated with the Hall-effect sensor 730.

When the rotor 710 spins, the Hall effect sensor 730 will see changes in the magnetic field at the sensor location whenever the notch 731 passes it producing a pulse of a positive or negative polarity. Such pulses can be counted with an external counter, which may be a part of a control unit 752 and the number of pulses per unit time can be used to calculate the rotational speed of the rotor.

The present disclosure describes embodiments of a Rotational Speed Sensor integrated into a Radial Homopolar Permanent-Magnet-Biased Electromagnetic Actuator. Other embodiments and advantages are recognizable by those of skill in the art by the forgoing description and the claims.

What is claimed is:

1. An electromagnetic actuator with an integrated rotational speed sensor for radial support of a rotor having a rotational axis, the electromagnetic actuator comprising:
    a first and a second radial control poles adjacent to an outer surface of the rotor, separated from the outer surface of the rotor by first and second radial control air gaps, respectively, and configured to communicate magnetic flux with the outer surface of the rotor, the first radial control pole and the second radial control pole magnetically coupled to each other, and the first radial control pole, the second radial control pole and the rotor forming a radial control magnetic circuit;
    a first and a second electrical windings wound around the first and the second radial control poles respectively and producing radial control magnetic flux in the radial control magnetic circuit when energized with electrical currents;
    a bias magnetic flux return pole spaced axially from the radial control poles, adjacent to the outer surface of the rotor, separated from the outer surface of the rotor by an air gap and configured to communicate magnetic flux with the outer surface of the rotor, and the rotor, the first radial control pole, the second radial control pole and the bias magnetic flux return pole forming a magnetic bias circuit;
    a permanent magnet magnetically coupled to the first radial control pole, the second radial control pole and the bias magnetic flux return pole and configured to generate magnetic bias flux in the magnetic bias circuit;
    the radial control magnetic flux and the magnetic bias flux exert a radial force on the rotor when superimposed in the first and the second radial control air gaps;
    a Hall effect sensor configured to measure a magnetic field in the air gap between the magnetic flux return pole and the rotor; and
    a speed sensor triggering notch on the outer surface of the rotor that produces a circumferentially local discontinuity in the magnetic field measured by the Hall effect sensor.

2. The electromagnetic actuator of claim 1 wherein the rotor comprises a shaft and an actuator target rigidly mounted on the shaft; the actuator target comprising electrical steel laminations stacked together axially and electrically insulated from each other to transfer the radial control magnetic flux between the first and the second radial control poles while suppressing electrical eddy currents.

3. The electromagnetic actuator of claim 2 wherein the shaft is magnetically permeable and transfers magnetic bias flux between the actuator target and the bias magnetic flux return pole.

4. The electromagnetic actuator of claim 2 wherein the rotor comprises a magnetically permeable actuator target extension magnetically coupled to the actuator target to transfer magnetic bias flux between the actuator target and the bias magnetic flux return pole.

5. The electromagnetic actuator of claim 3 wherein the shaft has an outer cylindrical surface; the bias magnetic flux return pole is adjacent to the outer cylindrical surface of the shaft and separated from the outer surface of the shaft by an air gap and the speed sensor triggering notch is located on shaft outer cylindrical surface.

6. The electromagnetic actuator of claim 4 wherein the actuator target extension has an outer cylindrical surface; the bias magnetic flux return pole is adjacent to the outer cylindrical surface of the actuator target extension and separated from the outer surface of the actuator target extension by a radial air gap and the speed sensor triggering notch is located on the outer cylindrical surface of the actuator target extension.

7. The electromagnetic actuator of claim 4 wherein the actuator target extension has an axial facing outer surface; the bias magnetic flux return pole is adjacent to the axial facing outer surface of the actuator target extension and separated from the an axial facing outer surface of the actuator target extension by an axial air gap and the speed sensor triggering notch is located on the axial facing outer surface of the actuator target extension.

8. The electromagnetic actuator of claim 1 wherein the Hall effect sensor is a first Hall effect sensor, and the electromagnetic actuator further comprises a second Hall effect sensor located at the same radius as the first Hall effect sensor but at a different angle with respect to the rotational axis of the rotor; and an output of the speed sensor is a difference between outputs of the first and the second Hall effect sensor.

9. The electromagnetic actuator of claim 1 wherein the Hall effect sensor is of programmable type which parameters can be programmed with the Hall effect sensor being installed in a machine.

10. The electromagnetic actuator of claim 1 wherein the flux return pole is sized to be permanently saturated by the bias magnetic flux.

11. A method of generating a radial force to radially support a rotor while measuring the rotational speed of the rotor, the method comprising:
    generating a bias magnetic flux within a bias magnetic circuit comprising the rotor, a radial control pole adjacent to a cylindrical surface of the rotor and separated from the cylindrical surface by an air gap, and a bias magnetic flux return pole adjacent to the rotor and separated from the rotor by an air gap;
    generating a control magnetic flux, superimposed on top of the bias magnetic flux in the radial control pole to produce a desired radial force;
    with a notch on the rotor cylindrical surface, causing a circumferentially local discontinuity in the magnetic flux density in the air gap between the rotor and the bias magnetic flux return pole;

measuring the magnetic field density changes in the air gap between the rotor and the bias magnetic flux return pole as the rotor rotates with a Hall effect sensor; and counting number of peaks or dips of a signal output from the Hall effect sensor per unit time to calculate the rotational speed of the rotor.

12. The method of claim 11, wherein generating the bias magnetic flux comprises generating the bias magnetic flux using a permanent magnet.

13. The method of claim 11, wherein generating the control magnetic flux comprises generating the control magnetic flux using an electrical current in a control coil wound around the radial control pole.

14. An electric machine system comprising:
a stator;
a rotor having a rotational axis and configured to move relative to the stator;
an electromagnetic actuator with an integrated rotational speed sensor subassembly comprising:
a plurality of radial poles residing apart from the rotor adjacent a cylindrical outer surface of the rotor and configured to communicate magnetic flux with the cylindrical outer surface of the rotor, the rotor and the plurality of radial poles defining a plurality of radial magnetic control circuits;
a bias magnetic flux return pole residing apart from the rotor adjacent the cylindrical outer surface of the rotor and configured to communicate magnetic flux with the rotor;
the plurality of radial poles configured to communicate magnetic flux with the rotor and the magnetic bias flux return pole;
the rotor, the plurality of radial poles and the bias magnetic flux return pole defining a magnetic bias circuit;
radial control conductive coils wound around the radial poles and configured to produce magnetic flux in the radial magnetic control circuit;
a Hall effect sensor configured to measure a magnetic field in an air gap between the bias magnetic flux return pole and the rotor; and
a notch on the rotor that produces a circumferentially local discontinuity in the magnetic field measured by the Hall effect sensor;
a position sensor configured to sense a position of the rotor;
a control electronics package configured to control the magnetic fluxes in the radial magnetic control circuits; and
an electronics package configured to count peaks or dips in an output signal from the Hall effect sensor per unit time and calculate the rotational speed of the rotor based on this count.

15. The electric machine system of claim 14, wherein the electronic control package is configured to control the magnetic fluxes in the radial magnetic control circuits by energizing radial control conductive coil with control currents.

16. The electric machine system of claim 14, wherein the magnetic fluxes exert electromagnetic forces on the rotor.

17. The electric machine system of claim 14, wherein the electronic control package is further configured to energize the radial control conductive coil with control currents in response to changes of signals from the position sensor so that the rotor is supported by electromagnetic forces without a radial mechanical contact with the stator.

* * * * *

UNITED STATES PATENT AND TRADEMARK OFFICE
CERTIFICATE OF CORRECTION

PATENT NO. : 9,559,565 B2  
APPLICATION NO. : 14/444293  
DATED : January 31, 2017  
INVENTOR(S) : Alexei Filatov and Josh Bowman Page 1 of 1

It is certified that error appears in the above-identified patent and that said Letters Patent is hereby corrected as shown below:

On the Title Page

Item (54) Title, and in the Specification, Column 1, Line 2, delete "ACTION" and insert --ACTIVE--.

Signed and Sealed this  
Seventeenth Day of March, 2020

Andrei Iancu  
*Director of the United States Patent and Trademark Office*